(12) United States Patent
Mercier et al.

(10) Patent No.: US 7,143,853 B1
(45) Date of Patent: Dec. 5, 2006

(54) ROLL-RELATED REACTIVE SYSTEM

(75) Inventors: Daniel Mercier, Longueuil (CA); Yves Berthiaume, Mont St-Hilaire (CA); Remy Biron, Mont St-Hilaire (CA); Alain Massicotte, Orford (CA)

(73) Assignee: Bombardier Recreational Products Inc., Valcourt (CA)

( * ) Notice: Subject to any disclaimer, the term of this patent is extended or adjusted under 35 U.S.C. 154(b) by 446 days.

(21) Appl. No.: 10/779,878

(22) Filed: Feb. 18, 2004

(51) Int. Cl.
*B62D 61/06* (2006.01)

(52) U.S. Cl. ................. 180/210; 280/88; 303/9.62; 303/9.68; 303/28

(58) Field of Classification Search ............. 280/88, 280/264; 180/210; 188/350; 303/9.62, 303/9.68, 9.71, 125, 28, 61
See application file for complete search history.

(56) References Cited

U.S. PATENT DOCUMENTS

| | | | | |
|---|---|---|---|---|
| 2,254,902 A | * | 9/1941 | Milster ............... | 180/6.3 |
| 3,888,328 A | * | 6/1975 | Leiber ............... | 180/437 |
| 4,088,199 A | * | 5/1978 | Trautwein ........... | 180/209 |
| 4,140,201 A | * | 2/1979 | Young ............... | 180/313 |
| 4,448,278 A | * | 5/1984 | Badsey .............. | 180/210 |
| 4,662,468 A | * | 5/1987 | Ethier .............. | 180/215 |
| 2003/0132075 A1 | * | 7/2003 | Drivers ............. | 188/350 |

FOREIGN PATENT DOCUMENTS

GB        2 234 303 A    *   1/1991

* cited by examiner

*Primary Examiner*—Ruth Ilan
(74) *Attorney, Agent, or Firm*—Osler, Hoskin & Harcourt LLP

(57) ABSTRACT

A three-wheeled vehicle having a pair of front wheels and a single rear wheel is provided with a roll-related reactive system. The roll-related reactive system provides braking of at least one of the front wheels independent of braking initiated by an operator of the vehicle.

9 Claims, 10 Drawing Sheets

ROLL-RELATED REACTIVE SYSTEM

FIELD OF THE INVENTION

The present invention relates to vehicles with stability control systems that improve driving stability of the vehicle. In particular, the invention relates to a three-wheeled vehicle having a roll-related reactive system.

BACKGROUND OF THE INVENTION

Motorized three-wheeled vehicles are well known in the art. Such vehicles are typically off road type or all terrain vehicles (also known as "ATVs"). Two different configurations of three-wheeled vehicles are generally known. The first configuration has two wheels at the front and one wheel at the back of the vehicle. The second configuration has one wheel at the front and two wheels at the back.

Regardless of the particular configuration for a three-wheeled vehicle, those skilled in the art recognize that three-wheeled vehicles are intrinsically less stable than four-wheeled vehicles, such as automobiles. Several factors contribute to this instability. One of them concerns the fact that a three-wheeled vehicle has only three contact points with the ground instead of four contact points.

It should be noted at the outset that the intrinsic instability of a three-wheeled vehicle versus a four-wheeled vehicle should not be understood to mean that a three-wheeled vehicle is unstable to the point that it is dangerous to a user. To the contrary, as would be understood by those skilled in the art, some designs for three-wheeled vehicles are inherently more stable than certain four-wheeled vehicles.

Another factor that affects the stability of a vehicle is the center of gravity of the vehicle. The height of the center of gravity of a vehicle is measured as a distance from the ground when the vehicle is at rest. The center of gravity changes based on the rider position and the type of seating arrangement provided.

A straddle seat type vehicle positions the rider higher from the ground and, as a result, typically creates a vehicle with a higher center of gravity than a vehicle that has a recumbent type seat, which is more stable but requires additional space and offers less rider control. Recumbent type seats include bucket seats, etc. of the type usually found in four-wheeled vehicles. Recumbent seat configurations generally position two riders side by side.

While straddle seats may alter disadvantageously the center of gravity of a vehicle, they offer certain advantages that are not available with recumbent seats. In particular, straddle seats allow a more compact riding position and permit the rider to lean into a turn for enhanced handling. Straddle seats also may provide a second passenger seat behind the driver seat, if desired, but the additional rider also raises the center of gravity of the vehicle.

An advantage of a tandem vehicle (riders positioned behind one another) is that the center of gravity of the vehicle remains symmetrically positioned if there are one or two riders. In contrast, on a light-weight, side-by-side, recumbent three-wheeler, when only the driver is present, the center of gravity is not located in the same position as when there are two riders in the vehicle. When only a driver is present in a three-wheeled vehicle with side-by-side, recumbent seats, the center of gravity will be offset from the longitudinal centerline of the vehicle in a direction toward the driver. As would be appreciated by those skilled in the art, this offset may have an affect on the handling performance of the recumbent-seated vehicle.

Other factors that affect stability include the distance between the wheels. On a vehicle, the wheel base refers to the distance between the front axle and the rear axle. The front track, on the other hand, refers to the distance between the center of the two front wheels, which is typically very similar to the distance between the center of the rear wheels in a four wheeled vehicle. A larger distance between the wheels (whether it be the wheel base or the wheel track) enhances the stability of the vehicle, but creates a larger vehicle, in terms of over all length and width, that may be less maneuverable because of the vehicle's increased size.

When operating any vehicle, especially a three-wheeled vehicle, stability is a concern during turning. When negotiating a curve, a vehicle is subject to centrifugal forces, as is readily understood by those of ordinary skill in the art of vehicle design. Generally, a higher center of gravity causes the vehicle to be more sensitive to centrifugal forces than a vehicle with a lower center of gravity.

Three contact points representing the tires define a triangle and both lateral sides of the triangle are closer to the vehicle CG than on a four-wheeled vehicle. A four-wheeled vehicle defines a square, the vehicle CG is therefore at a longer distance from the lateral side of the square. The dynamic displacement of the CG when the vehicle is cornering may pass over the lateral lines therefore getting over the vehicle stability threshold.

Three-wheeled vehicles raise special stability concerns since there is a smaller total tire contact area (with the ground) as compared with four-wheeled vehicles. Usually three-wheeled vehicles have a smaller mass. Therefore, the contact pressure of the tire on the ground is reduced. Moreover, if a straddle seat is employed, the center of gravity can be relatively high, as compared with that of a recumbent three-wheeled vehicle.

To equip a three-wheeled vehicle for road use, road tires must be employed. In a poorly designed vehicle, at high speeds or in sharp turns, the centrifugal forces generated on a road could exceed the traction threshold of a road tire, which could cause one or more of the tires to slip on the road surface. The slippage may be so severe that the vehicle could oversteer or understeer under certain circumstances.

Tire slippage is a phenomenon that is not unique to three-wheeled vehicles. The car industry experienced a similar stability concern with vehicles that have a high center of gravity. Sport Utility Vehicles (SUVs) tend to have high centers of gravity and are particularly sensitive to weight transfer and may tend to roll over when negotiating high lateral acceleration curves. As a result, electronic stability systems (ESS) have been developed to improve the stability of such vehicles.

As would be appreciated by those skilled in the art, modern road tires can offer considerable grip on a road surface. The gripping force of modern road tires can be so strong, in fact, that a vehicle with a high center of gravity vehicle may be subjected to forces that may cause the vehicle to exceed its rollover threshold. If the rollover threshold is exceeded, one or more of the vehicle's wheels on the inner side of the curve may lift off of the road surface. Under such circumstances, if the rider continues to apply a lateral acceleration to the vehicle, the rider may be able to roll the vehicle over. Rollover can also be experienced under severe oversteering conditions if the tires suddenly recover traction with the ground.

Electronic stability systems (ESS) are designed to electronically manage different systems on an automotive vehicle to influence and control the vehicle's behavior. An ESS can manage a considerable number of parameters at the same time. This provides an advantage over an automotive vehicle merely operated by a person since the driver can only manage a limited number of parameters at the same time. A typical ESS takes several inputs from the vehicle and applies different outputs to the vehicle to influence the vehicle's behavior. Examples of inputs include steering column rotation, the longitudinal and transverse acceleration of the vehicle, the engine output, the detection of the presence (or absence) of a rider and a passenger, the speed of the four wheels and the brake pressure in the wheel's brakes. Traditional ESS's use inputs from all four wheels. Some low-cost systems use reduced wheel speed inputs, but this does not result in optimal behavior. Inputs from suspension displacement and brake and accelerator pedal displacement can also be provided to the ESS.

The outputs from the ESS affect the automobile's behavior by generally independently managing the brakes on each wheel, the suspension, and the power output of the engine in order to improve the automobile's handling under certain circumstances. Since ESS's have been specifically developed for four-wheeled vehicles and rely on inputs provided by a four-wheeled vehicle, it is not convenient to adapt this kind of system to a three-wheeled vehicle. This is especially true since an ESS typically uses inputs from each of the four wheels independently and uses the braking system independently on all of the wheels. It is also possible to adapt suspension settings corresponding to the four wheels to change the behavior of the vehicle.

As would be appreciated by those skilled in the art, there are many ways in which suspension behaviors can be modified. For example, the internal valve setting(s) in one or more of the shock absorbers may be changed mechanically or electronically. Alternatively, the spring pre-load may be adjusted. Additionally, the fluid viscosity in the shock absorber may be adjusted by subjecting a magnetorheological fluid to an external electric or magnetic field.

A three-wheeled vehicle configured with a single wheel at the rear of the vehicle does not provide all the information/data input required by a four-wheeled vehicle ESS. For example, there is only one rear wheel from which the ESS can receive input on speed. Moreover, on a vehicle having two rear wheels, when the brake is applied to one wheel, a "yaw moment" is generated about a vertical axis passing through the center of gravity of the vehicle. On a vehicle having only one rear wheel, the rear wheel is positioned in the same plane as the longitudinal axis of the vehicle, which makes it difficult to generate any "yaw moment" by applying the brake to the rear wheel. However, it is known that a very wide single rear tire can generate a small "yaw moment" under strong lateral acceleration due to lateral displacement of the tire contact patch. A vehicle experiencing understeer has limited cornering ability on the understeering axle. In order to create a stabilizing yaw moment, a single brake force must be applied to an inner rear wheel, since this will create a restoring moment by capitalizing on the surplus cornering force available from that tire. It is understandable that this may cause a problem when there is only one centered rear wheel.

A system that improves stability of a three-wheeled vehicle is desired in the industry. There is especially a need for such a system that can operate based on the detection of roll of the vehicle, without the assistance of an electronic control unit (ECU).

SUMMARY OF THE INVENTION

One aspect of an embodiment of the present invention applies a roll-related reactive system to a three-wheeled vehicle.

Another aspect of the present invention provides a roll detection system to affect braking of the vehicle without input from the driver.

An aspect of an embodiment of the present invention provides a roll detection system that communicates with a rear brake of the vehicle so as to cause actuation of the rear brake independent of braking caused by the driver. The actuation of the rear brake causes at least one of the front brakes to actuate.

In one embodiment of the present invention, a three-wheeled vehicle is provided. The vehicle includes a frame that has a front portion and a rear portion that defines a longitudinal axis, an engine that is supported by the frame, and a seat that is supported by the frame. The vehicle also includes a front suspension that is connected to the front portion of the frame, and two front wheels that are supported by the front suspension and are laterally spaced from one another. Each wheel has a tire mounted thereon that is suitable for road use. A rear suspension is connected to the rear portion of the frame, and one rear wheel is supported by the rear suspension and is operatively connected to the engine. The rear wheel has a tire mounted thereon that is suitable for road use and is centered with respect to the longitudinal axis of the vehicle. A braking system is operatively connected to the wheels. The braking system includes two front brakes that are operatively connected to the two front wheels, and a rear brake that is operatively connected to the rear wheel. An actuator is operatively connected to the rear brake for generating a torque when actuated. A roll detection system signals the actuator to actuate when the roll detection system detects a roll of the vehicle above a predetermined threshold, and causes the actuation of at least one of the two front brakes.

Another aspect of an embodiment of the present invention provides a roll detection system that communicate with at least one front brake so as to cause actuation of the front brake independent of braking caused by the driver.

A further aspect of an embodiment of the present invention provides a steering sensor that communicates in conjunction with the roll detection system with the at least one front brake so as to cause actuation of the front brake.

In another embodiment of the present invention, a three-wheeled vehicle is provided. The vehicle includes a frame that has a front portion and a rear portion that defines a longitudinal axis, an engine that is supported by the frame, and a seat that is supported by the frame. A front suspension is connected to the front portion of the frame, and two front wheels are supported by the front suspension and are laterally spaced from one another. Each wheel has a tire mounted thereon that is suitable for road use. A rear suspension is connected to the rear portion of the frame, and one rear wheel is supported by the rear suspension and is operatively connected to the engine. The rear wheel has a tire mounted thereon that is suitable for road use and is centered with respect to the longitudinal axis of the vehicle. A braking system is operatively connected to the wheels. The braking system includes at least one front brake and an actuator. The vehicle also includes a steering assembly that is supported by the frame and is operatively connected to at least one of the front wheels to transmit steering signals from an operator thereto. The steering assembly includes a steering user interface and a steering sensor that senses position variation of the steering user interface and communicates the position to the actuator. The vehicle further includes a roll detection system that signals the actuator to actuate when the roll detection system detects a roll of the vehicle above a predetermined threshold, and causes the actuation of at least one front brake.

An aspect of the present invention provides a force reduction device in the steering system that reduces the amount of force transmitted to at least one front wheel of the vehicle when excessive steering torque is present.

Another aspect of an embodiment of the present invention provides a self-braking device that is operatively connected to the steering system and the braking system. Excessive steering torque is converted to braking pressure so as to affect at least one of the front brakes of the vehicle.

A further embodiment of the present invention provides a three-wheeled vehicle, that includes a frame that has a front portion and a rear portion that defines a longitudinal axis, an engine that is supported by the frame, and a seat that is supported by the frame. A front suspension is connected to the front portion of the frame, and two front wheels are supported by the front suspension and are laterally spaced from one another. Each wheel has a tire mounted thereon that is suitable for road use. A rear suspension is connected to the rear portion of the frame. One rear wheel is supported by the rear suspension and is operatively connected to the engine. The rear wheel has a tire mounted thereon that is suitable for road use and is centered with respect to the longitudinal axis of the vehicle. A braking system is operatively connected to the wheels. The braking system includes two front brakes that are operatively connected to the two front wheels, a rear brake that is operatively connected to the rear wheel, and a brake actuator. The vehicle also includes a steering assembly that is supported by the frame and is operatively connected to at least one of the front wheels to transmit steering signals from an operator thereto. The steering assembly includes at least one tie rod and at least one knuckle that is operatively connected to the tie rod and the front wheel. At least one self-braking device is operatively connected to the steering assembly and the braking system. The self-braking device is disposed between the tie rod and the knuckle and is configured to cause actuation of the brake when a compressive force encountered by the tie rod exceeds a predetermined level.

Additional and/or alternative objects, features, aspects and advantages of the embodiments of the present invention will become apparent from the following description, the accompanying drawings and the appended claims.

BRIEF DESCRIPTION OF THE DRAWINGS

For a better understanding of the present invention as well as other objects and further features thereof, reference is made to the following description which is to be used in conjunction with the accompanying drawings, where.

DESCRIPTION OF PREFERRED EMBODIMENTS

Figure 1:
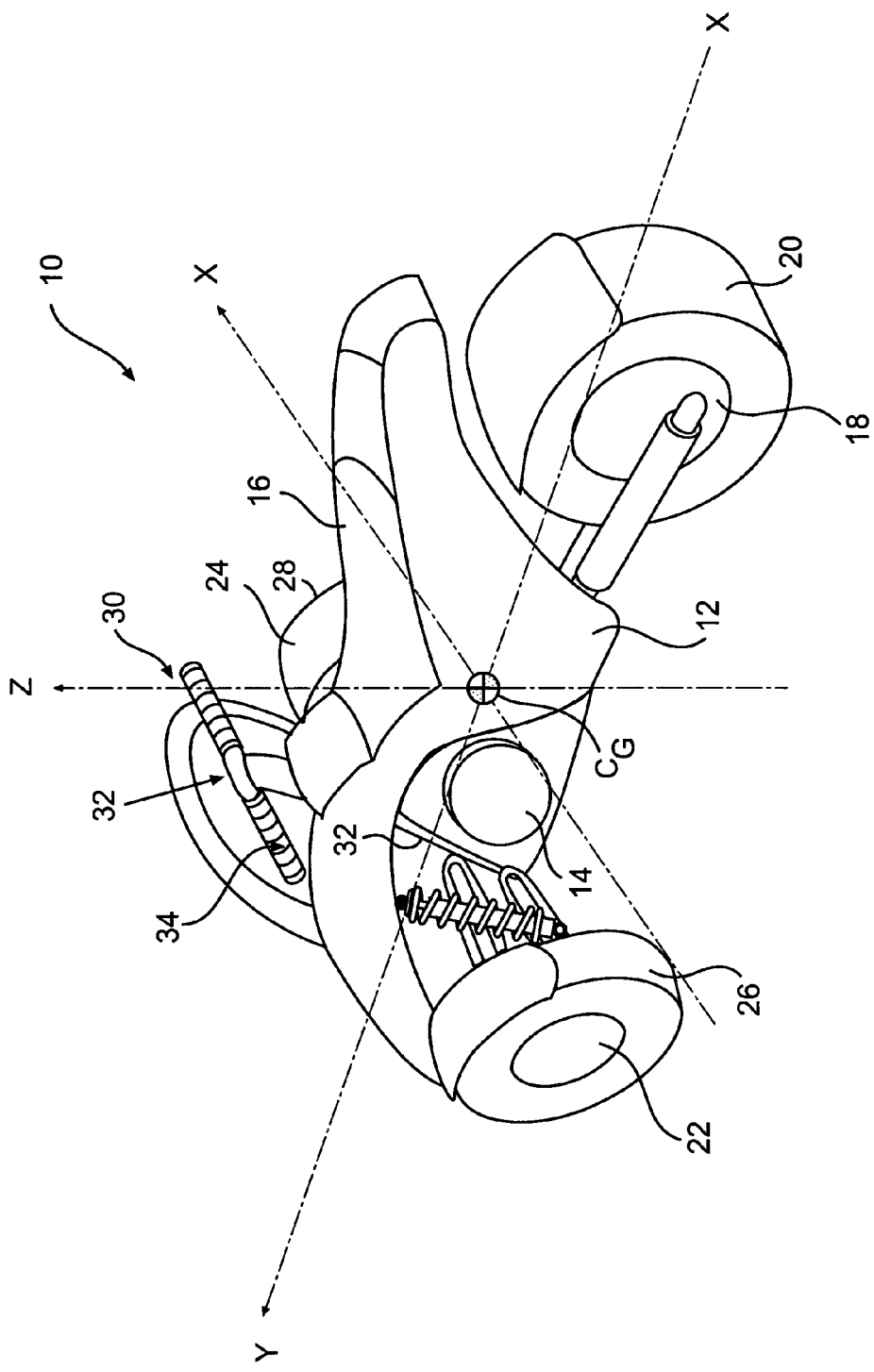
FIG. 1 is a rear perspective view of a three-wheeled vehicle with a straddle type seat in accordance with an embodiment of the invention.

FIG. 1 illustrates a three-wheeled vehicle 10 in accordance with an embodiment of the invention. The particular design details of the three-wheeled vehicle 10 are not critical to this invention, and FIG. 1 merely illustrates one possible configuration. Vehicle 10 includes a frame 12 that supports an internal combustion engine 14, which could also be any type of power source including an electric motor or fuel cell, if desired. While the engine is shown at the front of the vehicle 10, those skilled in the art would readily recognize that the engine 14 may be located at any suitable position on the vehicle 10 without departing from the scope of the invention.

Figure 2:
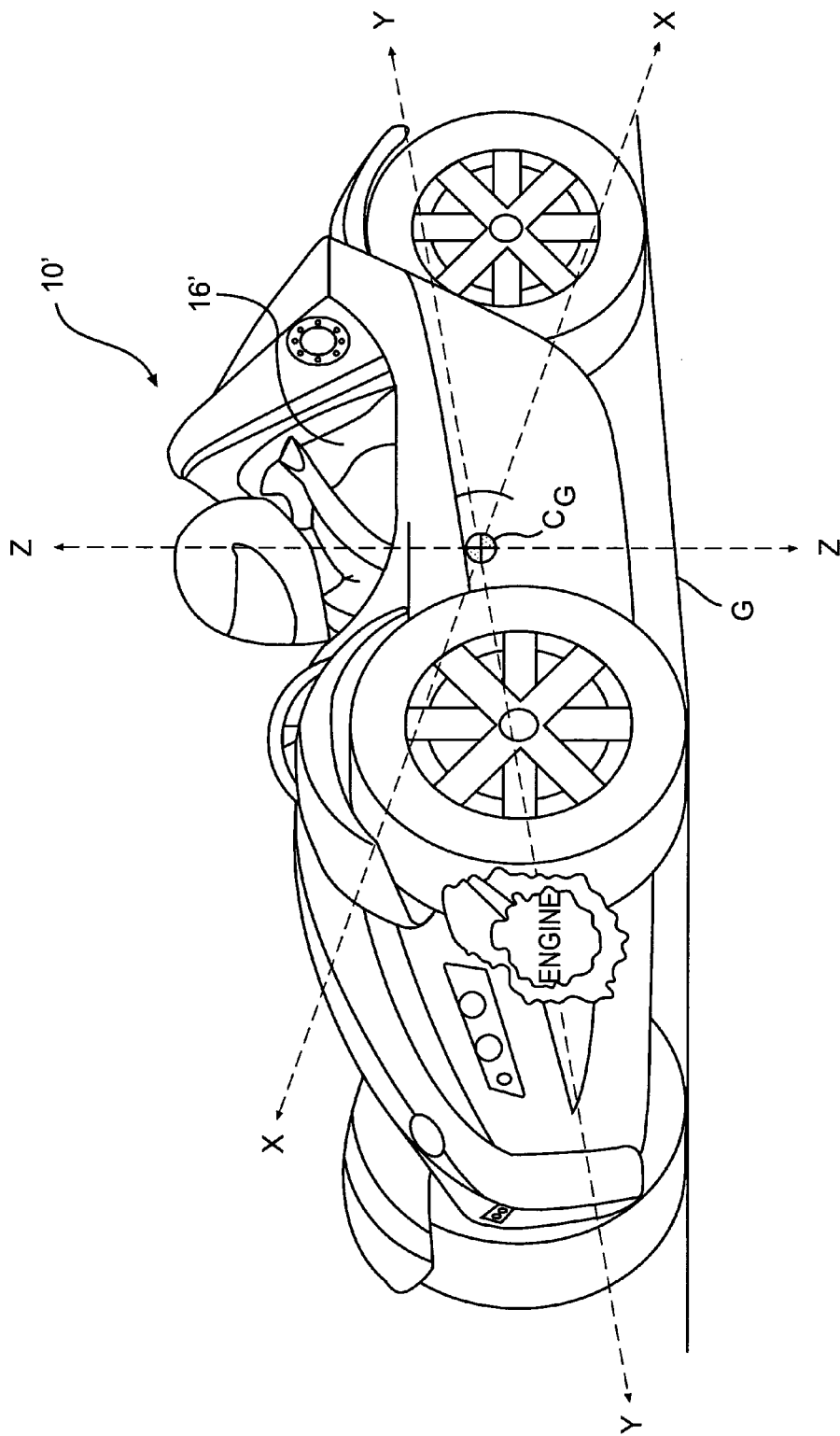
FIG. 2 is a front perspective view of a three-wheeled vehicle with a recumbent seat in accordance with an embodiment of the invention.

A seat 16 is mounted on the frame 12. Preferably, the seat 16 has a driver seat portion and may also include a passenger seat portion disposed behind the driver seat portion. As shown in FIG. 1, the seat 16 may be a straddle type seat. Alternatively, where the vehicle is a recumbent three-wheeled vehicle 10', shown in FIG. 2, the seat is a recumbent seat 16'. In an embodiment including the recumbent seat 16' for the driver and passenger, there may be two recumbent seats 16' disposed side-by-side, as would be appreciated by those skilled in the art.

Returning to FIG. 1, a single rear wheel 18 with a tire 20 suitable for road use is suspended from a rear suspension system at the rear of the frame 12 and is connected operatively to the engine 14. A pair of front wheels 22 and 24 are suspended from the front of the frame 12. Each front wheel 22 and 24 has a road tire 26 and 28 mounted thereon. Each of the wheels are mounted with a suspension assembly that may include a damping mechanism such as a shock absorber.

A steering assembly 30 is coupled to the front wheels 22 and 24 and is supported by the frame 12 for transmitting steering commands from the driver to the front wheels 22 and 24. The steering assembly 30 can include a steering user interface 32 and a steering control mechanism 34, such as a handle bar, steering wheel, joystick or other known steering control mechanism.

Figure 3:
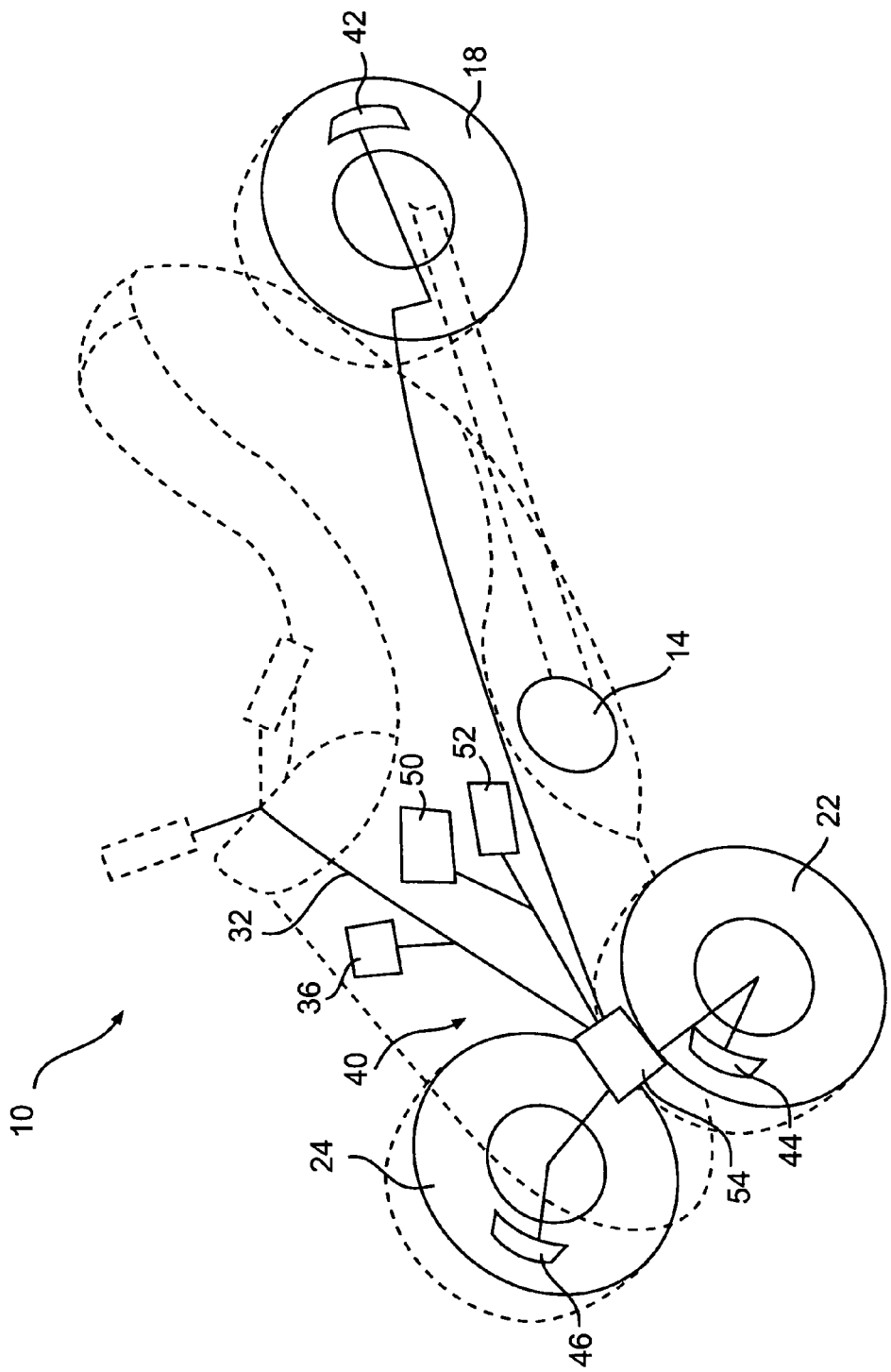
FIG. 3 is a schematic view of a three-wheeled vehicle showing some of the components of one embodiment of a braking system of the invention.

As shown in FIG. 3, a steering sensor 36 may also be connected to the steering assembly 32. The steering sensor 36 generates signals representative of the vehicle's intended course. The steering sensor 36 may be an angle mounting sensor and may be in the form of a contact wiper arrangement, such as a potentiometer, a contactless proximity sensor, such as a Hall IC, or an anisotropic magneto-resistive sensor. Reed switches may also be used to indicate the rotative position of the steering user interface 32.

The vehicle 10 has a center of gravity $C_G$ that will change slightly when a rider is positioned in the vehicle 10, as is known. If the dry weight of the vehicle 10 is relatively low, the rider's weight may affect the height of the center of gravity of the vehicle, depending upon the distance from the seat 16 to the ground G. FIG. 1 illustrates the longitudinal axis y that extends the length of the vehicle, the transverse axis x that is generally perpendicular to the longitudinal axis y, and a vertical or yaw axis z, which is orthogonal to the two other axis. Each of the axes extend through the center of gravity $C_G$.

Satisfactory handling of a vehicle can be defined according to whether a vehicle maintains a path that accurately reflects the steering angle while remaining stable. A critical factor in assessing handling is the dynamic lateral response of the vehicle. This response is based on the vehicle's lateral motion, which is the float angle, and the tendency to rotate around the vertical axis z, which is the yaw rate. Controlling the yaw rate can reduce the float angle, thus improving control and handling of the vehicle.

A dynamic control system for a vehicle typically controls the yaw of the vehicle by controlling the braking effort at various wheels of the vehicle. Yaw control systems compare the desired direction of the vehicle based upon the steering wheel angle and the direction of travel of the vehicle. The desired direction of travel can be maintained by controlling, among other things, the amount of braking at each wheel. Such control, however, does not address roll of the vehicle, which as noted above is a concern in vehicles having a high center of gravity. To minimize roll over tendencies, it is desirable to maintain contact between the tires and the ground.

A vehicle with rubber tires rotates at an angle relative to the ground to generate lateral guiding forces (cornering forces) between the wheel and the road surface. The angle is called the slip angle. Vehicles experience understeering when the front end's slip angle increases more rapidly than the rear slip angle as lateral acceleration rises. Higher rear slip is referred to as oversteer.

Cornering a vehicle generates centrifugal forces on the vehicle, which are a concern when the centrifugal forces climb beyond the lateral forces at the wheels and the vehicle's guided direction cannot be maintained. Centrifugal forces are influenced by various factors including the vehicle's cornering radius, the vehicle's speed, the height of the vehicle's center of gravity, the vehicle's mass, the vehicle's track width, the vehicle's tire/road surface friction pairing (weather, pavement, tire condition), and the load distribution in the vehicle. Banked curves act as a positive counteractive influence against these forces. Electronic stability systems capitalize on this idea to apply graduated active braking to different wheels, which slide at different times, to restore the vehicle to stable operation. However, implementing a stability system that does not rely on an ECU presents a greater challenge.

Figure 4:
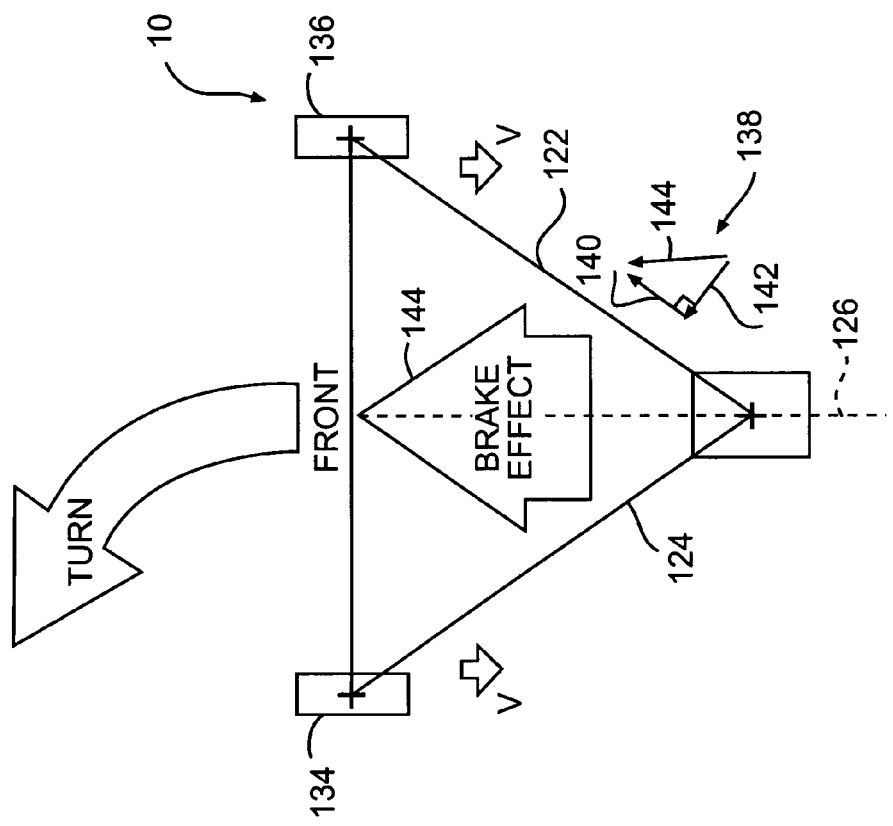
FIG. 4 is a schematic diagram illustrating the effect of a braking force when applied to a three-wheeled vehicle.
Figure 5:
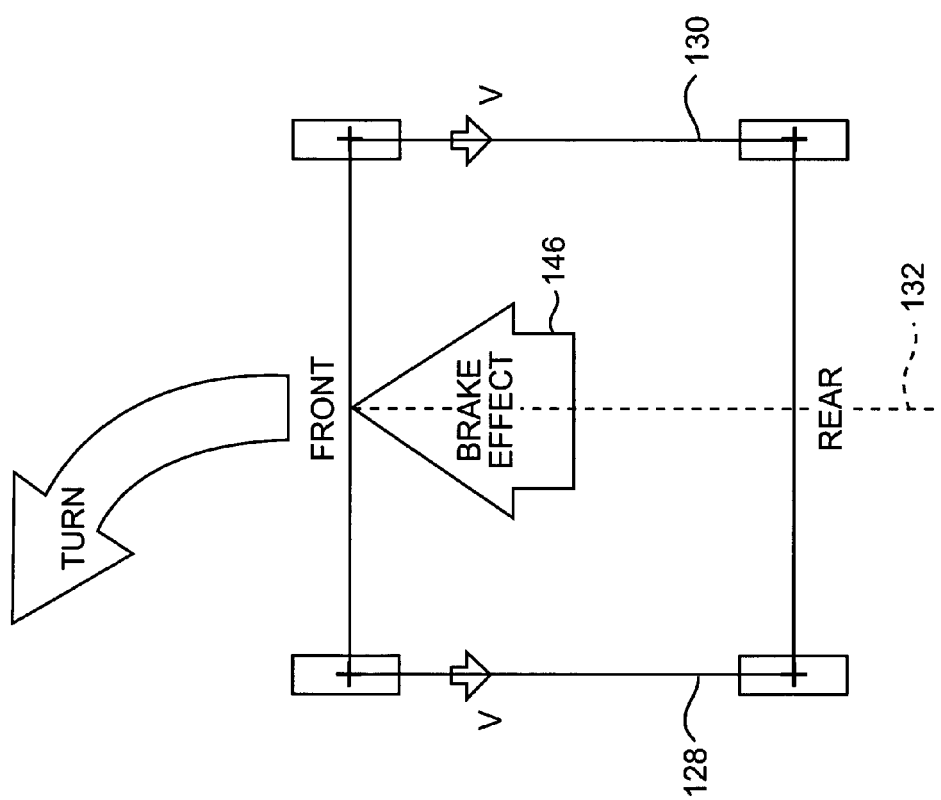
FIG. 5 is a schematic diagram illustrating the effect of a braking force when applied to a four-wheeled vehicle.

One feature of a three-wheeled vehicle 10 that differs from a four-wheeled vehicle results from the triangular shape of the three-wheeled vehicle. In particular, the triangular shape establishes roll axes 122, 124 that are not parallel to the longitudinal axis 126 of the vehicle. FIG. 4 provides a schematic diagram of the roll axes 122, 124 for a three-wheeled vehicle 10. Referring to FIG. 5, the roll axes 128, 130 for a four wheeled vehicle are parallel to the longitudinal axis 132 of the vehicle.

Since the roll axes 122, 124 for a three-wheeled vehicle 10 are not parallel to the longitudinal centerline 126 of the vehicle, if a braking force V is established by one of two front tire footprints 134, 136 while the vehicle 10 is turning, the braking force V will have an effect on the vehicle that is explained by the vectorial diagram 138 in FIG. 4. As shown, the braking force V will have a first force component 140 that is parallel to the roll axis 122 and a second force component 142 that is perpendicular to the first force component 140. The second force component 142 tends to counteract the tendency for the vehicle to roll over. In other words, the second force component 142 has a corrective effect on the vehicle 10 because it pushes on the vehicle 10 in a direction perpendicularly to the roll over axis 122. The second force component 142, therefore, assists the vehicle 10 to turn in the direction indicated in FIG. 4. This corrective effect is not established for a four-wheeled vehicle because the roll axes 128, 130 are parallel to the longitudinal centerline 132 of the vehicle. The third force component 144 is the vectorial result of the first and second force components 140, 142. It is the same as the brake effect on the vehicle.

In FIG. 5, the vectorial component 146 of the brake effect is illustrated for a four-wheeled vehicle so that the vectorial differences between three-wheeled vehicles and four-wheeled vehicles may be more readily identified. Since a four-wheeled vehicle has a roll axis that is parallel to the longitudinal axis, when a braking force V is applied, the only effect generated thereby is the braking effect 146.

Returning to FIG. 3, the vehicle 10 also includes a braking system 40 that includes a brake 42, 44, and 46 at each wheel 18, 22, and 24, respectively. The braking system 40 may also include a brake booster with a master cylinder 50, a primer pump 52 and a hydraulic modulator with a primary pressure sensor 54. The pressure sensor 54 measures expansion rates and known methods of taking such measurements include strain gauges and variations in magnetic fields. These sensors are generally deployed with a hydraulic braking system. In one embodiment, the braking system 40 is an antilock braking system (ABS). Other embodiments of the braking system are contemplated and the braking system should not be considered to be limited to the one illustrated in FIG. 3.

Figure 6:
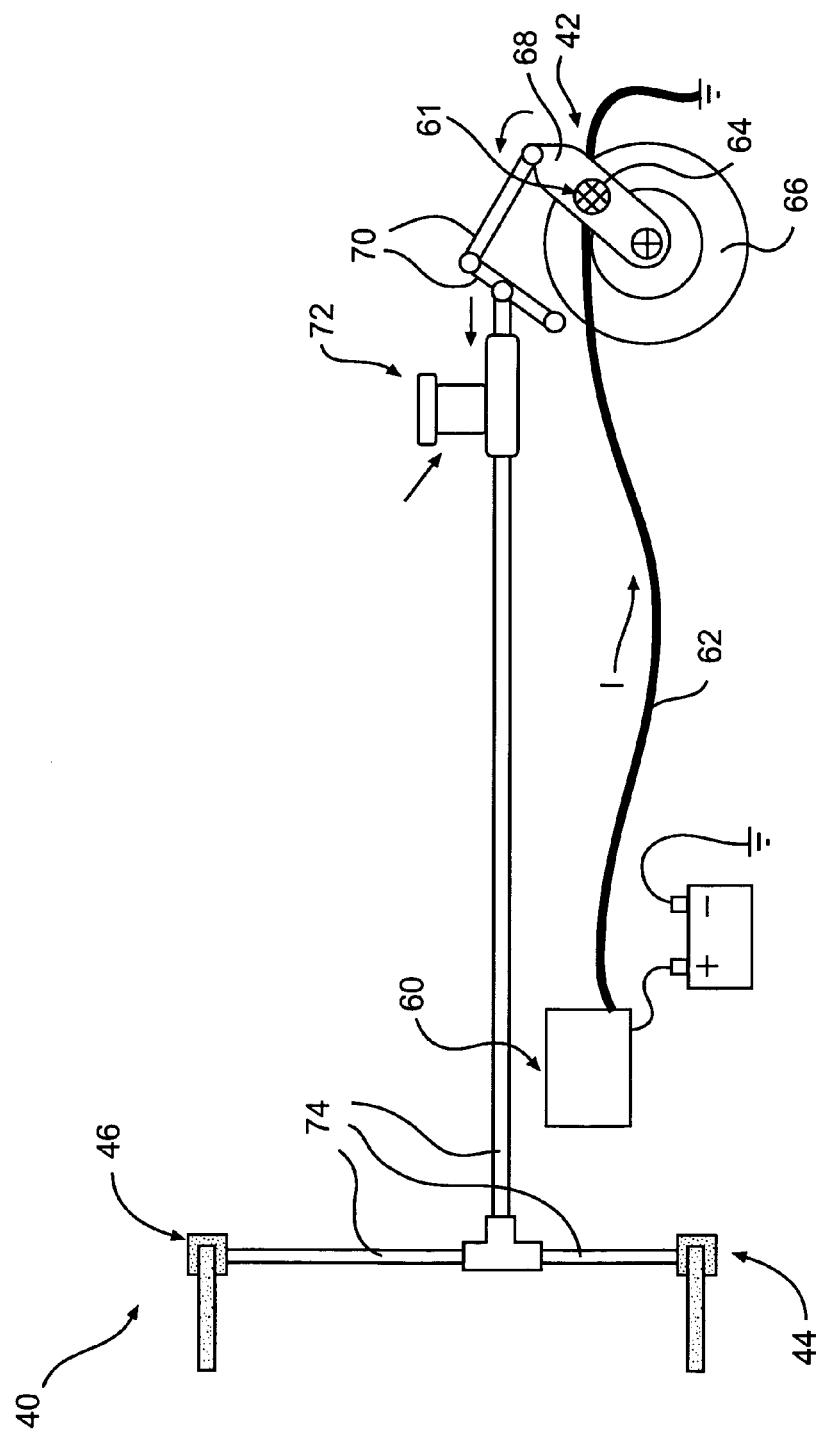
FIG. 6 is a schematic diagram of another embodiment of a braking system of the invention.

As shown in FIG. 6, in at least one embodiment, a roll detection system 60 is provided. The roll detection system 60 may include a gyrometer, or may be any type of mechanical system that can generate a signal based on the level of roll, or roll angle, of the vehicle 10, or when the roll exceeds a predetermined threshold value. For example, the roll detection system 60 may include a plurality of reed switches that are disposed about the y axis to detect the tilt, or roll, of the vehicle substantially about the y axis. It is understood that there are many other ways to detect the roll of the vehicle 10 and the ones mentioned herein should not in any way be considered to be limiting.

In the embodiment illustrated in FIG. 6, the roll detection system 60 is in communication with an actuator 61 that is operatively connected to the rear brake 42 so as to generate a torque when actuated. Upon detection of the vehicle 10 rolling or tilting, the roll detection system 60 sends a signal through a cable 62 that is connected to an electro-magnet 64 that is part of the actuator 61. Actuation of the electro-magnet 64 causes the rear brake 42 to contact a rear disc 66, thereby causing a mechanical link 68 that supports the electro-magnet 64 to move forward toward the front of the vehicle 10. As shown, the mechanical link 68 is connected to additional mechanical links 70, which are operatively connected to a cylinder 72, such as a hydraulic cylinder or a pneumatic cylinder, that is operatively connected to the front brakes 44, 46 of the braking system 40. Activation of the actuator 61 displaces fluid from the cylinder 72, which causes an increase in pressure in lines 74 disposed between the cylinder 72 and the front brakes 44, 46. This increase in pressure causes the front brakes 44, 46 to actuate.

Thus, the actuator 61, via the electro-magnet 64, causes braking of the front wheels 22, 24, most notably the outer front wheel, relative to the direction of the roll. Because there is only so much adherence available from the outer tire, using some adherence for braking limits the lateral adherence, thereby causing the outer wheel to slip and reduce (or even possibly reverse) the roll rate. This in effect causes understeering of the vehicle, which is desirable when the vehicle is rolling about one of its roll axes 122, 124.

It is understood that if the braking system 40 is an antilock braking system (ABS), the signal generated by the roll detection system 60 may be sent directly to the hydraulic pump 52 to actuate at least one of the front brakes 44, 46, thereby achieving the same effect in regards to causing the outer wheel to slip and reduce the roll rate.

In another embodiment, the steering sensor 36 may be in communication with the roll detection system 60 so that any roll that is generated by the vehicle 10 as it passes over a bump in the road does not cause the roll detection system 60 to initiate braking of the wheels 18, 22, 24 inadvertently. In other words, the steering sensor 36, which indicates the position of the steering user interface 32, will only trigger action by the roll detection system 60 when the steering user interface 32 is turned from center, thereby indicating that the vehicle 10 is turning.

Figure 8:
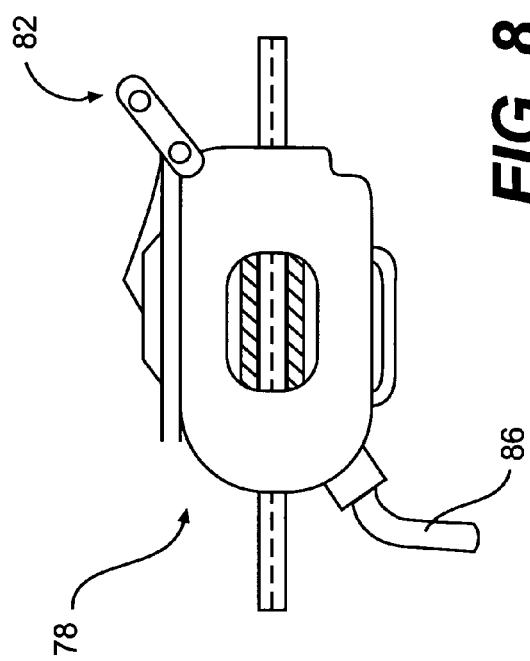
FIG. 8 is a top view of a portion of the front disc brake of FIG. 7.

In a further embodiment, the roll detection system 60 is in direct communication with the front brakes 44, 46, and causes actuation of at least one of the front brakes 44, 46 in a more direct way. In this embodiment, shown in FIGS. 7 and 8, the front brake 44 includes a disc 76, a caliper 78, an actuator 80 and a mechanical linkage 82 between the actuator 80 and the caliper 78. The caliper 78 may include a hydraulic cylinder. The actuator 80 is in communication with the roll detection system 60 and the steering sensor 36 via cables 84. The actuator 80 may include an electro-magnet 85. Activation of the actuator 80 causes mechanical activation of the caliper 78, thereby generating braking pressure on the disc 76. As shown in FIG. 8, the mechanical linkage 82 is configured to provide braking pressure independent of the normal braking pressure that is initiated by the driver via brake line 86.

Thus, by using the roll detection system 60 either alone, or in conjunction with the steering sensor 36, braking pressure can be applied to the brake of the outer wheel as the vehicle 10 is rolling during a turn so that the lateral adherence of the tire is decreased, thereby causing the outer wheel to slip and reduce (or even possibly reverse) the roll rate. This way, the vehicle 10 will be understeered without having to rely on the actions of the driver, thereby improving the stability of the vehicle 10.

Figure 9:
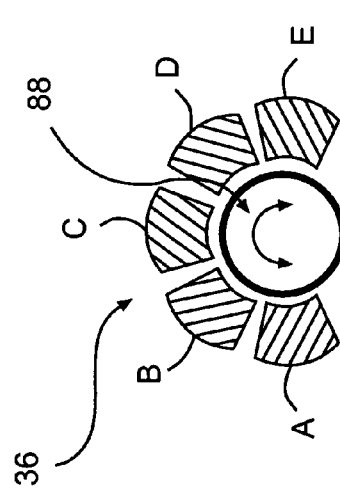
FIG. 9 is a schematic diagram of an embodiment of a steering sensor.
Figure 7:
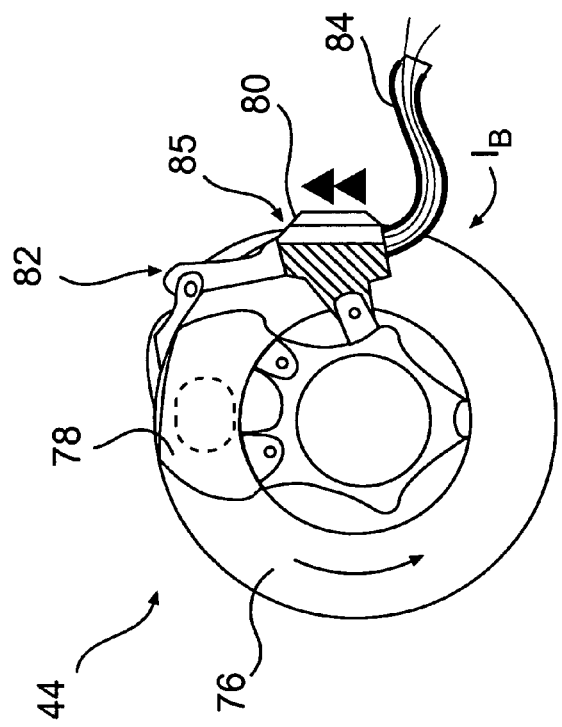
FIG. 7 is a side view of a front disc brake of an embodiment of the invention.

FIG. 9 shows one embodiment of the steering sensor 36 that may be used in any of the aforementioned embodiments. As shown, the steering user interface 32 includes an indicator 88 and is partially surrounded by a plurality of discrete positions A–E. When the indicator 88 is in communication with position C, the vehicle 10 is being steered in a substantially forward direction. As the steering user interface rotates clockwise (indicating a right-hand turn) or counter-clockwise (indicating a left-hand turn), the indicator 88, along with a corresponding sub-sensor positioned at A, B, D, or E, generates a current $I_B$ or voltage that is signaled to the electro-magnet 72 via cable 76, as shown in FIG. 7. It is understood that the roll detection system 60 may include a similar type sensor arrangement, as explained above. As would be appreciated by one of skill in the art, the steering sensor may be a potentiometer, or may be a discrete variable type sensor such that when the indicator 88 is positioned in positions A or E, the same discrete current or voltage is generated. Similarly, when the indicator is positioned in positions B or D, the same discrete current or voltage is generated, which is less than the discrete current or voltage that is generated at positions A or E. Preferably, a plurality of reed switches are disposed in positions A–E and are configured in this way. It is understood, however, that any type of sensor that can produce a voltage or current that is indicative of the rotational position of the steering user interface 32 may be provided.

Figure 10:
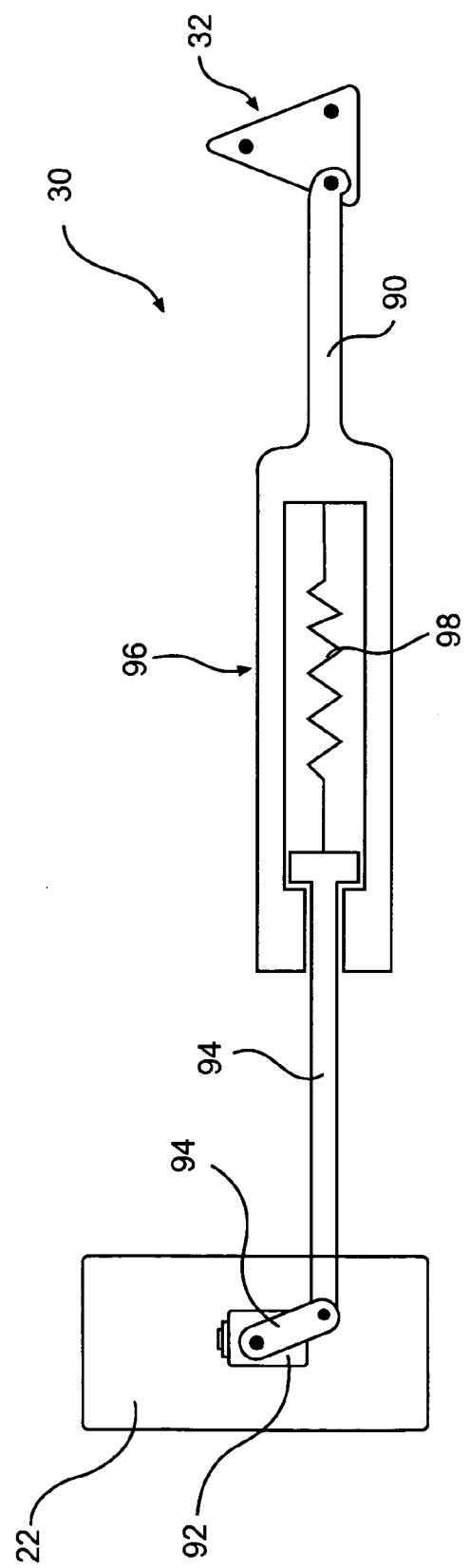
FIG. 10 is a schematic view of a steering force reduction device of an embodiment of the invention.

In another embodiment, the front brakes 44, 46 may be activated by forces that are generated from steering the vehicle 10. Although this embodiment of the roll-related reactive system will be described in connection with the left side of the vehicle 10 and the left front wheel 22, it is understood that the same configuration may be used in the right side of the vehicle 10 in connection with the right front wheel 24. A description of the left side of the vehicle 10, including the left front wheel 22, will now be described. As shown in FIG. 10, the steering assembly 30 also includes at least one tie rod 90 and a steering knuckle 92. The tie rod 90 is operatively connected to the steering user interface 32 at one end and is operatively connected to the knuckle 92 at the other end via interconnecting links 94, and the knuckle 92 is connected to the front wheel 22. When the steering user interface 32 rotates, the tie rod 90 transmits force to the knuckle 92 via the links 94 to affect the turning of the wheel, as is known in the art. However, when the vehicle 10 is turning at a speed that causes significant lateral acceleration, and vehicle roll, the steering torque is greatly increased, which translates to a significant increase in compressive force in the tie rod 90 connected to the outer wheel. If all of the force is transmitted to the knuckle 92, the vehicle 10 will tend to be oversteered, thereby decreasing the stability of the vehicle with respect to roll.

As illustrated in FIG. 10, a force reduction device 96 may be disposed between the tie rod 90 and the knuckle 92 so that the amount of compressive force that the tie rod 90 can transmit to the knuckle 92 can be reduced. This essentially "erases" excessive steering input that would tend to cause oversteering, which causes wheel lift. As shown, the force reduction device 96 includes a spring 98. Preferably, the spring 98 includes a high preload (of a predetermined amount) and low spring constant K. It is understood that other than a spring 98, the force reduction device 96 may be a cylinder that includes air, or any suitable fluid, under pressure to yield the same effect as a spring with a high preload and a low spring constant K. Preferably, the preload is at least about 50 lbs. Once the compressive force exceeds the preload, the spring 98 will compress, thereby decreasing the amount of force transmitted to the knuckle 92 so that the knuckle 92 will not turn the wheel 22 an excessive amount.

Figure 11:
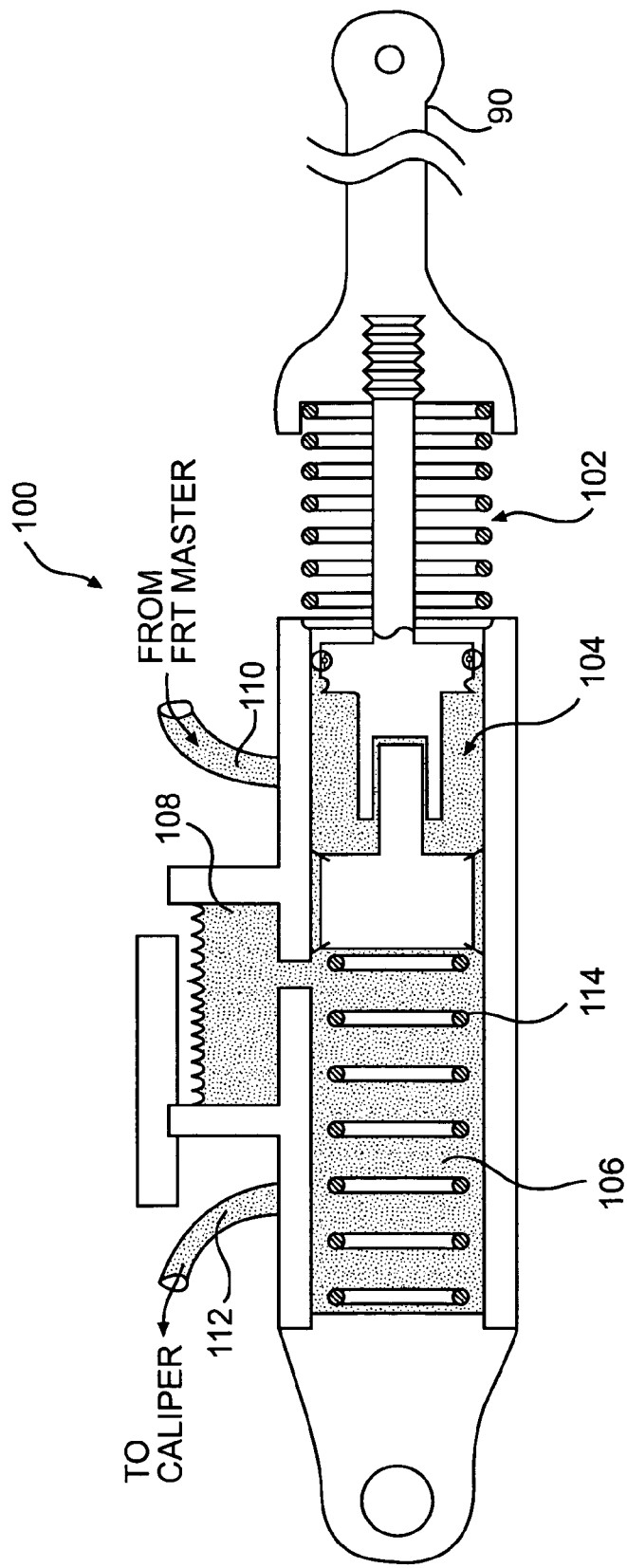
FIG. 11 is a schematic view of an embodiment of a self-braking device of the invention.

A variation of the force reduction device 96 is shown in FIG. 11. FIG. 11 illustrates a self-braking device 100. The self-braking device 100, like the force reduction device, is disposed between the tie rod 90 and the knuckle 92. The self-braking device 100 includes a spring 102 that is disposed between the tie rod 90 and a plunger 104, a pressure reservoir 106, and an overflow reservoir 108. The self-braking device 100 is fluidly connected to a front master cylinder (not shown) via line 110 and is also fluidly connected to the front brake caliper, such as caliper 78 shown in FIGS. 7 and 8, via line 112. As above, it is understood that any type of resilient member, such as a fluid cylinder, may be used in place of the spring 102.

With this configuration, the excess steering torque generated during the turning of the vehicle 10 will be transmitted via the self-braking device 100 in braking force to the outside wheel. This is because an excess steering torque will translate into a high compressive force in the tie rod 90. The compressive force in the tie rod 90 will compress the spring 102 so as to allow movement of the plunger 104, once the preload amount is exceeded. As the plunger 104 moves in a direction away from the tie rod 90, it increases the pressure within the pressure reservoir 106. The increase in pressure in the reservoir 106 will generate a braking force at the caliper through line 112. As discussed above, the braking force will decrease the lateral adherence of the tire, thereby causing the outer wheel to slip and reduce (or even possibly reverse) the roll rate.

The self-braking device 100 is connected to a master cylinder so that any braking initiated by the driver can be coordinated with the self-braking generated by the excessive steering torque. This way, the appropriate amount of pressure will be applied to the caliper at the outside wheel. The overflow reservoir 108 may be used to receive fluid that is displaced by the plunger 104 that is not needed to generate pressure in the pressure reservoir 106 to generate braking force. As shown, a resilient member 114 may be disposed within the pressure reservoir 106 to assist in providing the proper resistance to the movement of the plunger 104. It is understood that the embodiment shown in FIG. 11 is one example of the self-braking device and is not intended to be limiting in any way.

Figure 12:
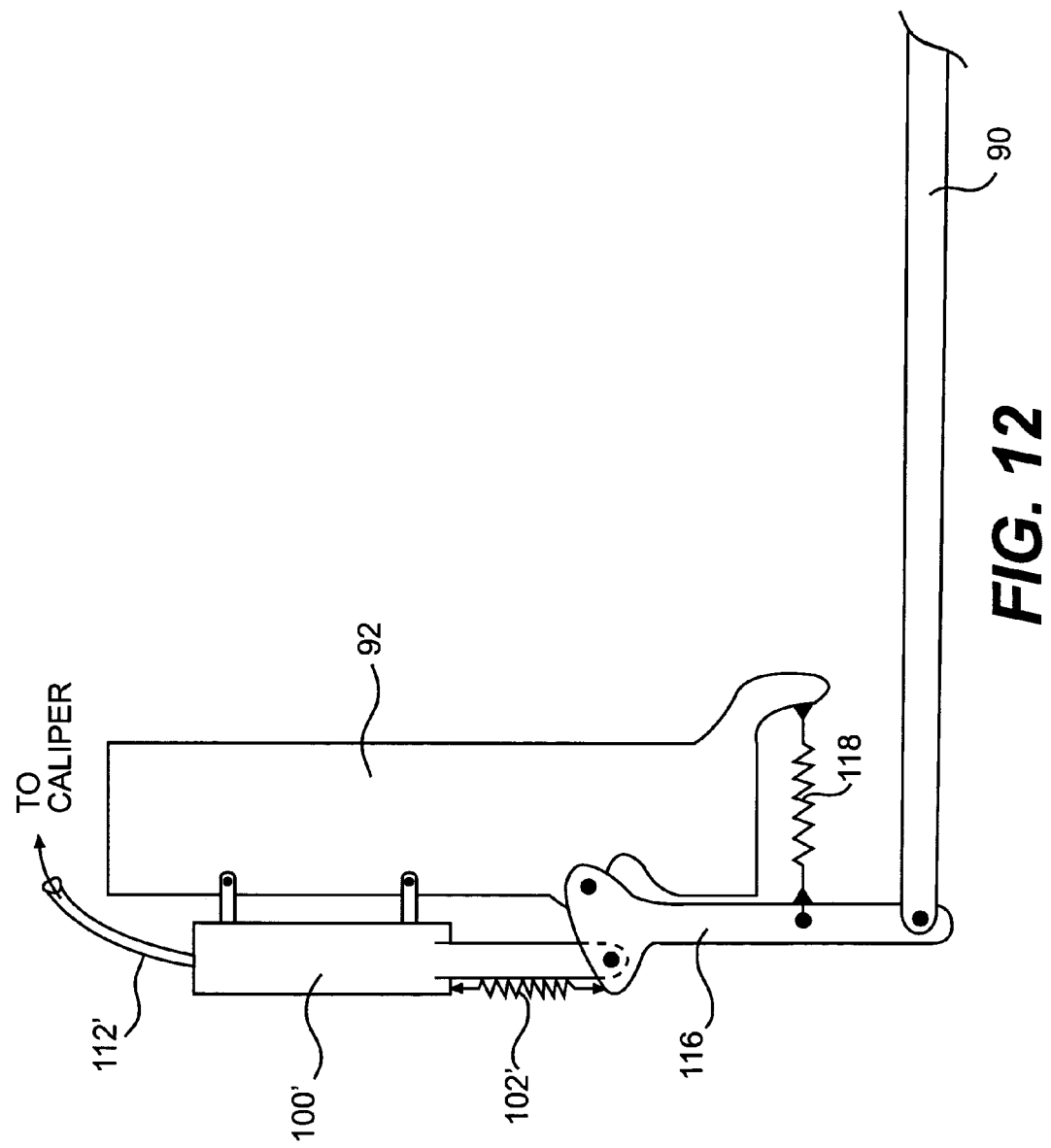
FIG. 12 is a schematic view of another embodiment of a self-braking device of the invention.

Another embodiment of a self-braking device 100' is illustrated in FIG. 12. In this embodiment, the self-braking device 100' is mounted directly to the knuckle 92 and is connected to the tie rod 90 via a pivoting lever 116. A spring 102' is positioned between the pivoting lever 116 and the self-braking device 100'. Preferably, the spring 102' has a high preload, such as at least about 50 lbs. Alternatively, or in addition, a spring 118 may be disposed between the pivoting lever 116 and the knuckle 92 and may include a lower preload, as compared to the high preload of spring 102', in tension. In this embodiment, as the tie rod 92 transmits excessive steering torque in the form of a high compressive force to the pivoting lever 116. The pivoting lever 116 will cause the self-braking device 100' to increase the pressure of the fluid that is transmitted to the caliper via tube 112'. Thus, once the preload in the spring 102' and/or 118 is overcome, the pivoting lever 116 will cause the front brake at the outside wheel to actuate and apply a braking force, thereby decreasing the roll of the vehicle 10.

While certain particular embodiments have been described above, further modifications and changes may be made to the specific elements of the invention while remaining within the scope of a stability control system for a three-wheeled vehicle in accordance with this invention.

What is claimed is:

1. A three-wheeled vehicle, comprising:
   a frame having a front portion and a rear portion defining a longitudinal axis;
   an engine supported by the frame;
   a seat supported by the frame;
   a front suspension connected to the front portion of the frame;
   two front wheels supported by the front suspension and laterally spaced from one another, each wheel having a tire mounted thereon that is suitable for road use;
   a rear suspension connected to the rear portion of the frame;
   one rear wheel supported by the rear suspension and operatively connected to the engine, the rear wheel having a tire mounted thereon that is suitable for road use and being centered with respect to the longitudinal axis of the vehicle;
   a braking system operatively connected to the wheels, the braking system comprising two front brakes operatively connected to the two front wheels, a rear brake operatively connected to the rear wheel, and a brake actuator;
   a steering assembly supported by the frame and operatively connected to at least one of the front wheels to transmit steering signals from an operator thereto, the steering assembly comprising at least one tie rod and at least one knuckle operatively connected to the tie rod and the front wheel; and
   at least one self-braking device operatively connected to the steering assembly and the braking system, the self-braking device being disposed between the tie rod and the knuckle and configured to cause actuation of the brake actuator when a compressive force encountered by the tie rod exceeds a predetermined level.

2. The three-wheeled vehicle of claim 1, wherein the self-braking device comprises a resilient member configured to hold a pre-load of more than about 50 lbs.

3. The three-wheeled vehicle of claim 2, wherein the resilient member comprises a spring.

4. The three-wheeled vehicle of claim 2, wherein the resilient member is selected from a group consisting of a pneumatic cylinder and a hydraulic cylinder.

5. The three-wheeled vehicle of claim 2, wherein the self-braking device further comprises a pressure reservoir in fluid communication with at least one of the front brakes and a plunger operatively connected to the tie rod and the resilient member, the plunger being configured to increase the pressure within the pressure reservoir when the compressive force encountered by the tie rod exceeds approximately 50 lbs.

6. The three-wheeled vehicle of claim 1, wherein the self-braking device is in fluid communication with the brake actuator.

7. The three-wheeled vehicle of claim 1, wherein the self-braking device is mounted to the knuckle.

8. The three-wheeled vehicle of claim 7, wherein the steering device further comprises a pivoting lever that is operatively connected to the tie rod and the self-braking device.

9. The three-wheeled vehicle of claim 8, wherein a resilient member is disposed between the pivoting lever and the self-braking device.

* * * * *